United States Patent [19]

Starkey et al.

[11] Patent Number: 5,428,555
[45] Date of Patent: Jun. 27, 1995

[54] FACILITY AND GAS MANAGEMENT SYSTEM

[75] Inventors: Sean C. Starkey; Richard Penstein, both of Santa Clara, Calif.

[73] Assignee: Praxair, Inc., Danbury, Conn.

[21] Appl. No.: 48,919

[22] Filed: Apr. 20, 1993

[51] Int. Cl.$^6$ .................. G06F 15/173; G01L 5/08
[52] U.S. Cl. .................. 364/551.01; 364/510; 364/141; 364/188; 340/870.13; 340/318; 340/309.4
[58] Field of Search ........... 364/510, 551.01, 413.01, 364/143, 413.02, 467, 138, 510, 550, 143, 579; 395/200; 340/870.13, 318, 309.4

[56] References Cited

U.S. PATENT DOCUMENTS

| | | | |
|---|---|---|---|
| 4,517,637 | 5/1985 | Cassell | 364/138 |
| 4,724,435 | 2/1988 | Moses et al. | 340/870.13 |
| 4,847,782 | 7/1989 | Brown, Jr. et al. | 364/143 |
| 4,888,706 | 12/1989 | Rush et al. | 364/510 |
| 4,893,270 | 1/1990 | Beck et al. | 364/900 |
| 4,989,160 | 1/1991 | Garrett et al. | 364/143 |
| 4,998,205 | 3/1991 | Ricard | 364/467 |
| 5,072,383 | 12/1991 | Brimm et al. | 364/413.01 |
| 5,077,666 | 12/1991 | Brimm et al. | 364/413.02 |
| 5,134,574 | 7/1992 | Beaverstock et al. | 364/551.01 |
| 5,146,561 | 9/1992 | Carey et al. | 395/200 |
| 5,220,517 | 6/1993 | Sierk et al. | 364/550 |
| 5,329,463 | 7/1994 | Sierk et al. | 364/510 |

OTHER PUBLICATIONS

SPAN Sales Brochure for "Subeca PGM/1000 ™ Process Gas Management System ™", May 1989, pp. 2–6, 8.

Primary Examiner—Emanuel T. Voeltz
Assistant Examiner—Alan Tran
Attorney, Agent, or Firm—Cornelius F. O'Brien

[57] ABSTRACT

An interactive computer-controlled management system for real-time data gathering and analysis of process information relating to a plurality of data sources in a facility and for controlling process functions of the data sources. In a preferred embodiment, the data sources include gas cabinet panels and related process equipment typically found in a wafer fab facility. The system operates in a distributed processor environment and includes a host processor having graphic, control and user interfaces and a multi-ported processor networked to the host processor. The multi-ported process includes protocol sensitive hardware interfaces for communication with the programmable logic controllers of each particular data source. The multi-ported processor also includes software means for emulating a common protocol such that each gas cabinet or other connected device appears to the host processor as an address location in a memory of the multi-ported processor. The address locations are sequentially polled by the host for updated status, alarm and set point information which is displayable at the host terminal. The functions of the management system are divided into three primary information management and monitoring areas including alarm management, map functions and administrative functions. The alarm management functions permit acknowledgement of alarms and retrieval of updated alarm information. The map functions provide specific information about gas cabinets and other components within the facility. The administrative functions control basic system operation such as access, report generation and shut down procedures.

12 Claims, 12 Drawing Sheets

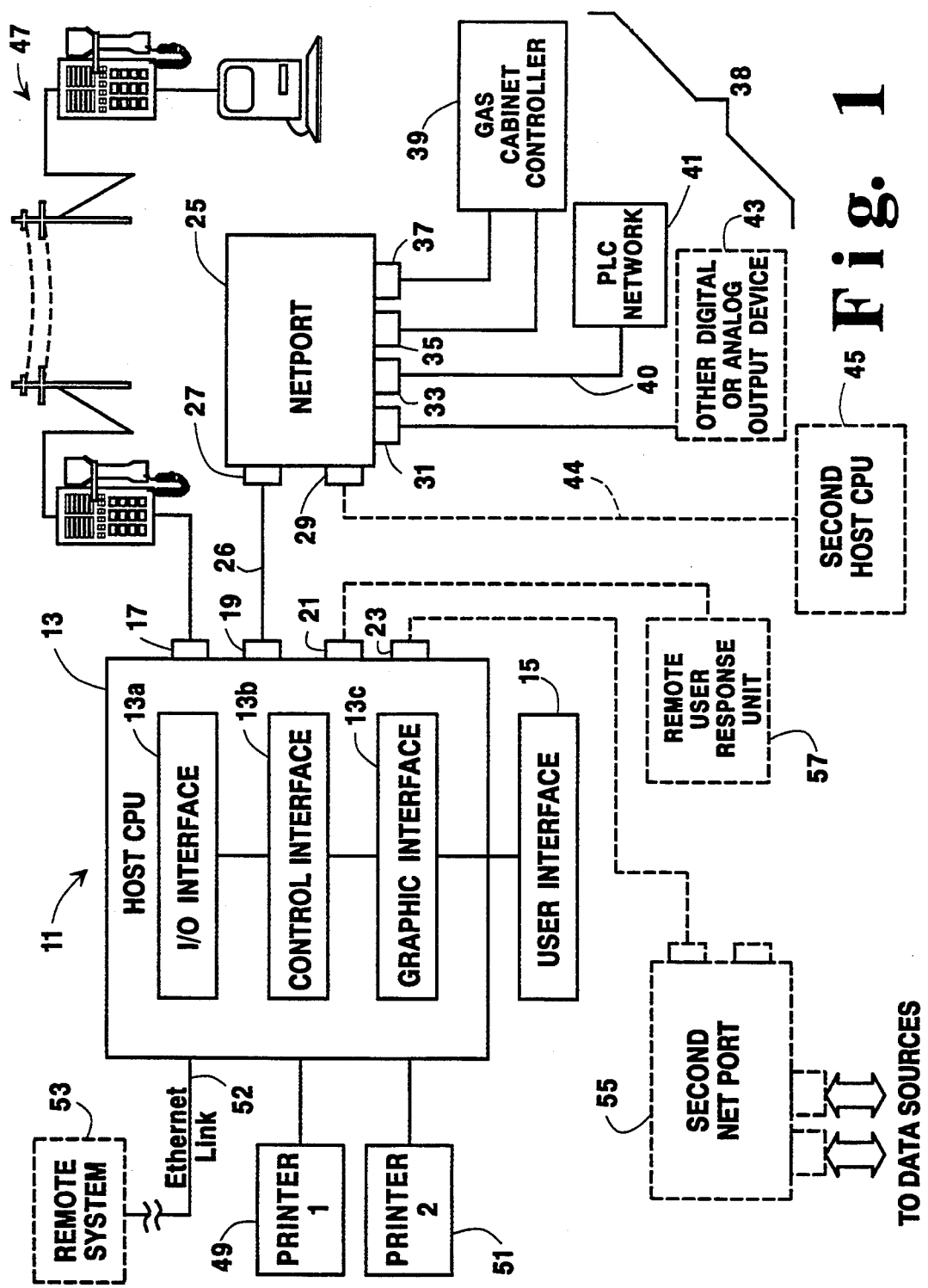

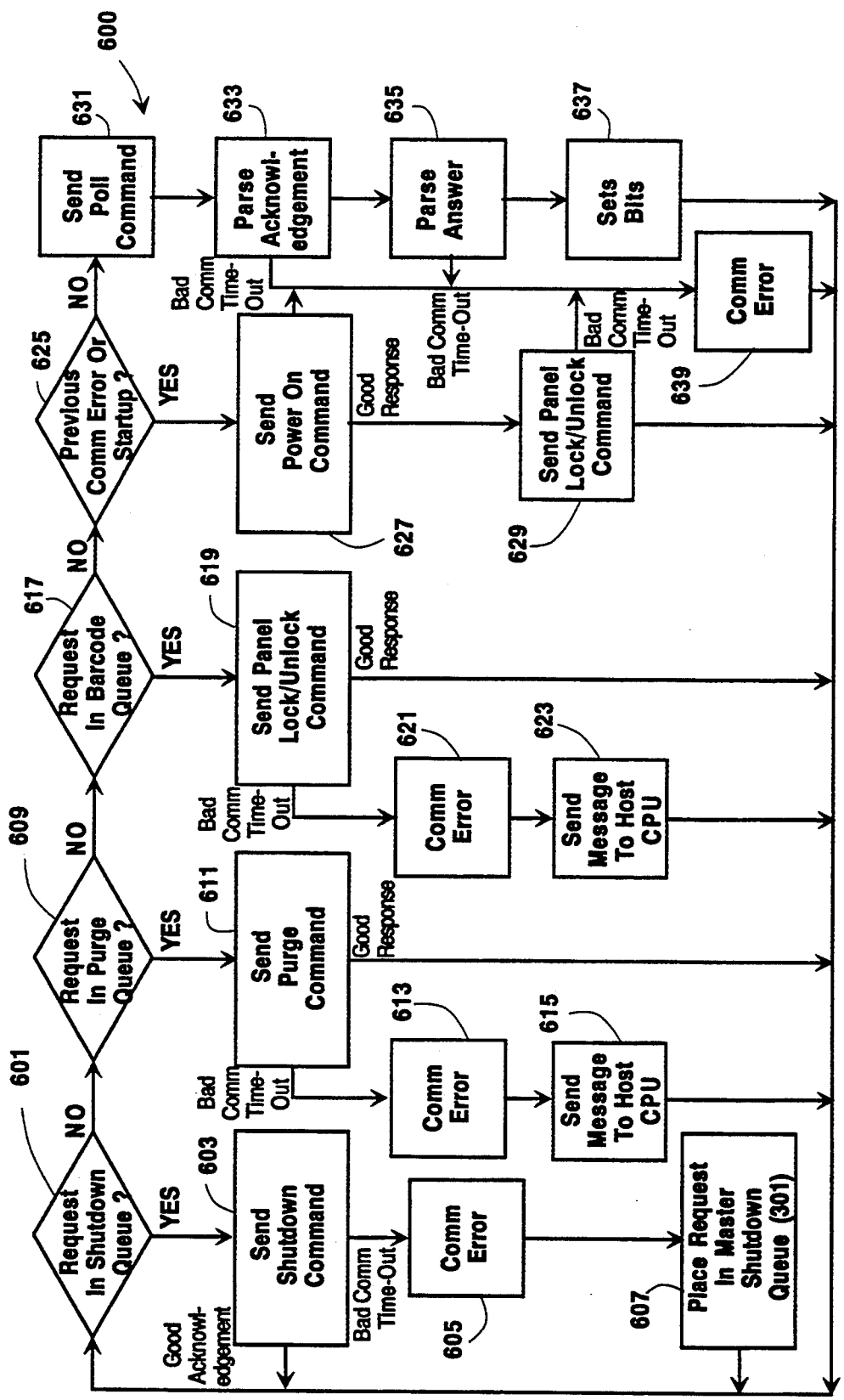
Fig. 7 (LOW SPEED NETWORK)

FACILITY AND GAS MANAGEMENT SYSTEM

SPECIFICATION

FIELD

The invention relates generally to fluid control and management systems. More particularly, the invention relates to a gas management system which includes a plurality of networked processors for real time data gathering and system analysis to enable a user to monitor, control and report on all types of data sources such as, for example, gas cabinets and related process equipment in a wafer fabrication facility.

BACKGROUND

Management systems which use a computer for monitoring, controlling and reporting on the status of a piece of process equipment in a manufacturing facility are generally known in the art and have been in existence for several years. In the semiconductor manufacturing industry, for example, gas cabinets are used to supply high purity process gases used in wafer fabrication. The various process gases contained in these gas cabinets are highly toxic. Accordingly, it is critical to be able to closely and safely control the flow of gases through the gas cabinets to ensure the health and safety of the workers. Also, it is very important to know up to the minute information regarding the status of each gas cylinder within each cabinet in order to ensure smooth and timely switchovers when the gas cylinders become empty and therefore avoid "dry runs" or other misprocessing errors.

Typically, in the known gas management systems, each gas cabinet includes a programmable logic controller (PLC) which communicates status and alarm information to a mainframe or minicomputer. Each PLC monitors several internal inputs (such as gas applied pressure, gas delivery pressure, flow rate, etc.) as well as several external inputs (such as toxic gas detectors, UV/IR sensors, seismic sensors and the like). Until recently, these mainframe and minicomputer-based systems provided the only solution for computerized gas management on a facility-wide scale since only these systems could provide the necessary memory and performance to archive and save changes and alarms.

However, the information fields displayable on a host terminal in these systems were very primitive. Also, the software written for these systems were not capable of being programmed to perform more than a limited number of tasks. Further, these systems were cost prohibitive to many users.

Over the last three years, there has been a major shift in the technology such that personal computers (PCs) now approach the speed and performance levels previously only attainable by mainframe or minicomputer based systems. As the PC became more powerful, many facility management software packages were developed to take advantage of the increased performance they offered, including providing graphic screen displays which contained some simple information concerning the gas cabinets. This, in turn, afforded the user some limited monitoring capability. As the software at the PC level became more robust, it also proved that it had the capability and safety to perform the desired control functions. Accordingly, it is now common to see more and more PC-based gas management and control packages which operate on a single stand alone device. These systems are fully functional in that they provide display of graphical depictions of a gas cabinet and usually also provide the functional capabilities for data acquisition, data logging and report generation and offer some control capability.

However, one of the problems in writing software for such PC-based systems is supporting changes in the graphics software and finding bugs in order to give the customer a graphical user interface (GUI) with the desired options. Consider, for example, the typical software problems encountered each time a user desires to upgrade or replace a peripheral piece of equipment within a system. Typically since in the usual case, each piece of peripheral equipment, whether it is a printer, a monitor, a keyboard, or a mouse, has its own dedicated hardware interface. Accordingly, for an upgrade, the controlling software has to be tied in some way to the new device interface. Where the upgradable device includes additional functions, such as video, voice, I/O control, etc., a higher level of software knowledge and technique is required in order to properly incorporate the new functions into the existing system. Also, since the graphic capabilities of a system take up approximately 80% of the software time and investment, response time between the data sources to be maintained and controlled and the controlling computer decreases significantly as additional data sources and/or I/O devices are added to the system.

Accordingly, there is a definite need in the art for a management system which permits the addition of a substantially unlimited number of data sources such as PLC operated gas cabinets and other process equipment, to be controlled by a host computer on a system without a significant decrease in response time. There is also a need in the art for such a system which permits the modular integration of existing software packages and hardware interfaces which use different protocols.

Accordingly, it is a principle object of the present invention to provide an improved management system for monitoring and control of a plurality of data sources in a facility which overcomes the problems of the prior art.

In particular, it is an object of the present invention to provide a facility and gas management system for real time data gathering, analysis and control of gas cabinets and related process equipment in a wafer fab facility.

It is another object of the present invention to provide a facility and gas management system which operates in a distributed processor environment including a host processor having graphic, control and user interfaces for operating in a work station environment and a multi-ported processor networked to the host processor and having commercially available hardware interfaces for communication with controllers for the gas cabinets and the other connected devices in their respective protocol specific PLC environments and wherein the multi-ported processor includes software means for emulating a common protocol such that each gas cabinet or other connected device appears to the host processor as an address location in a memory of the multi-ported processor and wherein the address locations are sequentially polled for updated status, alarm and set point information which is displayable to a user/operator at the host processor.

Other and further object will be apparent from the following written description, drawings and claims.

THE INVENTION
DRAWINGS

FIG. 1 is a schematic block diagram of the system architecture in accordance with a preferred embodiment of the present invention.

FIG. 2A is a graphic representation of a screen display illustrating the Facility Gas Management System Manager window.

FIG. 2B is a graphic representation of a generic screen display for one of the alarm windows, in this case the Alarms-Main Network window.

FIG. 2C is a graphic representation of a screen display for the Map Locator window which shows a user-definable pictorial representation of the complete facility including the make and model of each piece of equipment and its location within the facility as defined by the user.

FIGS. 5-7 are a series of state diagrams illustrating the state sequencing of a Device Network (FIG. 5), a High Speed Network (FIG. 6) and a Low Speed Network (FIG. 7) associated with the Communication Port Evaluation function block of FIG. 3.

SUMMARY

Figure 1A:
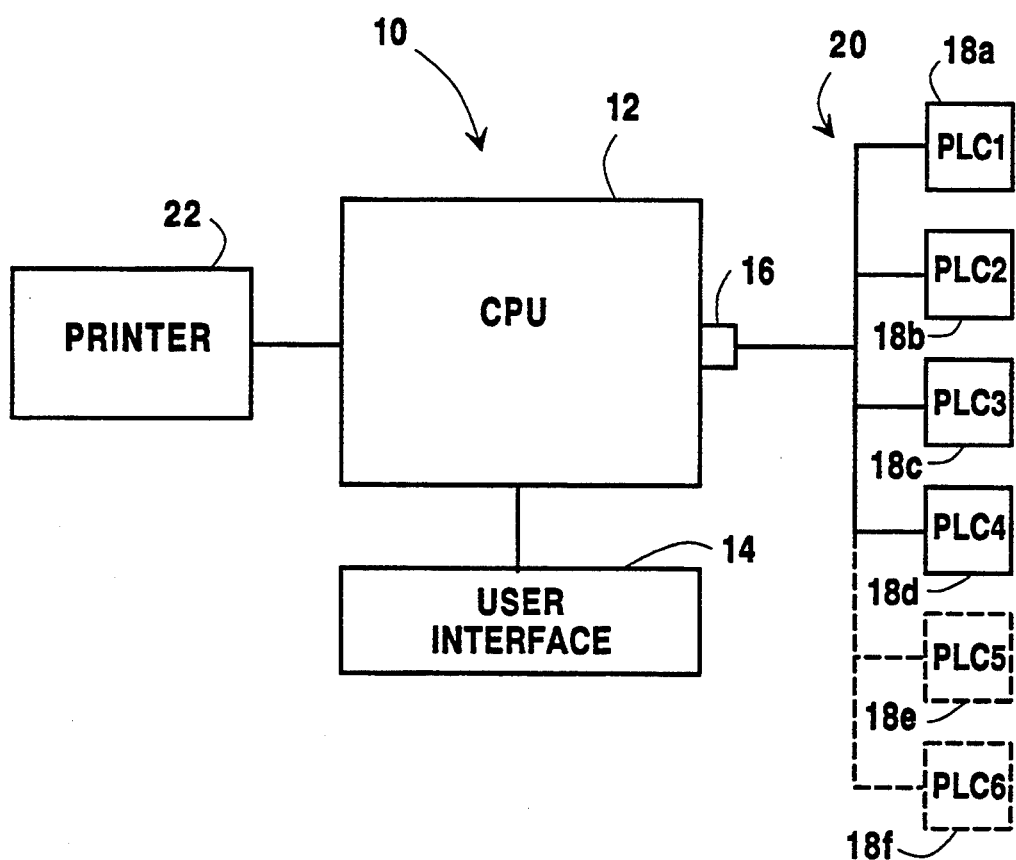
FIG. 1A is a schematic block diagram of a prior art management system.

The invention concerns a Facility and Gas Management System (FGMS) for real-time data gathering and analysis of process information for use in a complex wafer fabrication and other like process facilities. The FGMS enables a user to monitor, control and report on all types of gas cabinets and other equipment. The FGMS provides a redundant, networked system for monitoring process and purge gas cylinder change requirements, performing remote purges and shutdowns and for ordering cylinders. In addition to being a gas management system, the FGMS can efficiently monitor and control gas cabinets, security sensors, temperature sensors, seismic sensors, and particle monitoring equipment.

The FGMS basic system architecture comprises a multi-ported programmable logic controller (PLC) or "netport" for connecting the various types of data sources, such as gas cabinets, process equipment and input/output devices to a host computer, preferably a personal computer (PC) or a work station. The host computer includes a graphic interface for display of the plant system's status. All graphic capability is handled solely by the host computer. The netport polls the status of the various pieces of the connected data sources and transmits only relevant information to the host computer, such as for example, information concerning an alarm condition of a particular gas cabinet. Isolation of the graphics functions from the scanner in this fashion ensures a greater response time of the system.

The network is installed with an open architecture wherein each main wire path may be up to 4,000 feet in length. The main wire path is daisy chained or teed into networked clusters of data sources such as gas cabinets, sensors, process equipment, etc. Each type of data source has a dedicated port on the netport to which it is addressed. The size of a netport determines the system's capacity. The open-ended architecture of the invention permits the addition of a virtually unlimited number of netports to the host computer which in turn provides a system capable of monitoring and controlling a large number of data sources. The FGMS uses a dual redundant network with much less wiring than conventionally wired systems. Dual redundancy ensures that both the network cable and the netport are essentially duplicated for system reliability. A single alarm signal can be programmed to shut down one, several, or all data sources (i.e., gas cabinets). Other networking systems such as Ethernet ® and local area networks such as Novell ® and LanTastic ® are fully supported. A second host computer may be connected to an individual netport to provide access to the system from a different location and to provide an additional measure of redundancy.

The system database, architecture and graphical information are user definable depending upon a user's particular configuration requirements. The FGMS system preferably operates in the Microsoft Windows ® environment to provide an object-oriented graphical user interface (GUI), thus allowing a user to move between windows or screens simply by selecting objects and buttons to process a command or function.

As is well known in the art, Windows provides a practical knowledge of both the hardware and software in a system such that the hardware options can be picked independent of the software, thus resulting in upgrade and platform independence. The invention takes advantage of the flexibility afforded by Windows' Dynamic Data Exchange (DDE) and utilizes a fully functional high level software graphics package, such as the Intouch ™ Man/Machine Interface Application Generator, available through Wonderware Software Development Corporation of Irvine, California, to generate a set of logically mapped generic screen displays which represent the physical layout of the facility and all the various input/output devices (e.g., the netport, the gas cabinets, PLCs, etc.) connected to the system. The Wonderware software is also used to interface with the netport at the PLC level.

The multi-ported netport preferably includes emulation means such that all data sources connected to the netport, irrespective of their different protocols, appear to the host computer as a single bank of PLC addresses having the same protocol. Each screen on the display has a particular channel corresponding to each PLC address. In this way, process equipment, monitoring and other input/output devices from different manufacturers, each of which may communicate through different protocols, may be networked via the netport to the host computer. Available software packages may be molecularly integrated within the host computer without modification to provide the desired control, monitoring and reporting capabilities. Windows-based reporting output software packages, such as, for example, Excell for Windows ™ available through Microsoft ®, are easily tailored within the system to produce the desired reporting options.

In operation, information concerning a gas cabinet or any other data source connected to the netport is displayed and managed through the graphical user interface (GUI). Logged information concerning all data including analog information, alarms, status, and all system activities may be displayed by sequencing through the windows in response to user interactive buttons displayed on the screen. Notebook files are provided which enable a user to enter information on work performed or make notes on future activity and requirements.

The system functions of the FGMS are divided into three primary information management and monitoring areas including Alarm Management; Map Functions; and Administrative Functions. The Alarm Management enables a user to acknowledge alarms and view information for Set Point Alarms, System Alarms, Network Alarms, External Alarms, and Log On Alarms as well as preprogrammed Message Alerts. The Map Functions provide specific information about gas cabinets and other components within a specific user defined configuration. The Administrative Functions of the system provide commands and functions to:

1. Log on to the system;
2. Access and view all alarms status information sequentially for any type of alarm;
3. Inhibit an alarm audio indicator;
4. Use designated areas;
5. Print reports; and
6. Shut down the system.

Other features and advantages of the present invention will be apparent from the following description and claims and are illustrated in the accompanying drawings which, by way of illustration, show preferred embodiments of the present invention and the principles thereof and what are now considered to be the best modes contemplated for applying these principles. This description will clearly enable one skilled in the art to make and use the invention, and describes several embodiments, adaptations, variations, alternatives and uses of the invention. Other embodiments of the invention embodying the same or equivalent principles may be used and structural changes may be made as desired by those skilled in the art without departing from the present invention and the purview of the appended claims.

DETAILED DESCRIPTION OF THE BEST MODE

The features and advantages of the invention are best understood by comparison to an example prior art Facility and Gas Management System 10 illustrated in FIG. 1A. The prior art Facility and Gas Management System 10 typically comprises a single CPU 12 having a user interface 14 and a programmable logic controller interface (PLC) 16 which is connected to a plurality of data sources (i.e., PLCs 18a–18d) connected via a party line network 20. The PLCs 18a–18d, may for example, represent the controllers for the gas panel of individual gas cabinets in a wafer fabrication facility. In the most simplified version of the management system 10, each PLC 18a–18d is a controller from the same manufacturer and they share the same protocol so that they all may communicate directly to the host CPU 12 through the PLC interface 16. The host CPU 12 preferably includes resident software for generating real time graphics in a windows environment for monitoring and controlling each gas cabinet or other equipment associated with each PLC 18a–18d. Further, the CPU will typically include reporting software which is interfaced to an output device such as printer 2 for reporting log operations, alarm conditions, and any other desired information relating to the control and operation of the management system 10. In accordance with the usual practice, the CPU 12 employs a priority addressing scheme wherein a particular address is individually assigned to each PLC 18a–18d and whereby the CPU continuously repeats a sequencing scheme in order to review each address for changes. A change, for example, may indicate the occurrence of alarm condition, e.g., where a process gas cylinder needs replacement, or the exhaust flow for a particular gas cabinet is too low or too high, etc.

A disadvantage with the prior art management system 10 is the difficulty in supporting additional PLCs 18e, 18f, . . . , etc., which use a different protocol than the protocol for the PLC interface 16. Such a change requires modifications or changes to the software for the PLC interface 16 in order to smoothly integrate the additional PLCs 18e, 18f, . . . , etc.

Further, since the CPU 12 performs both control and graphic functions, and further in view of the fact that graphic software takes up to 80% of the software processing time, the system response time becomes unacceptably slow as additional data sources are added to the party line network 20 which are to be monitored and controlled by the host computer 12.

Figure 1B:
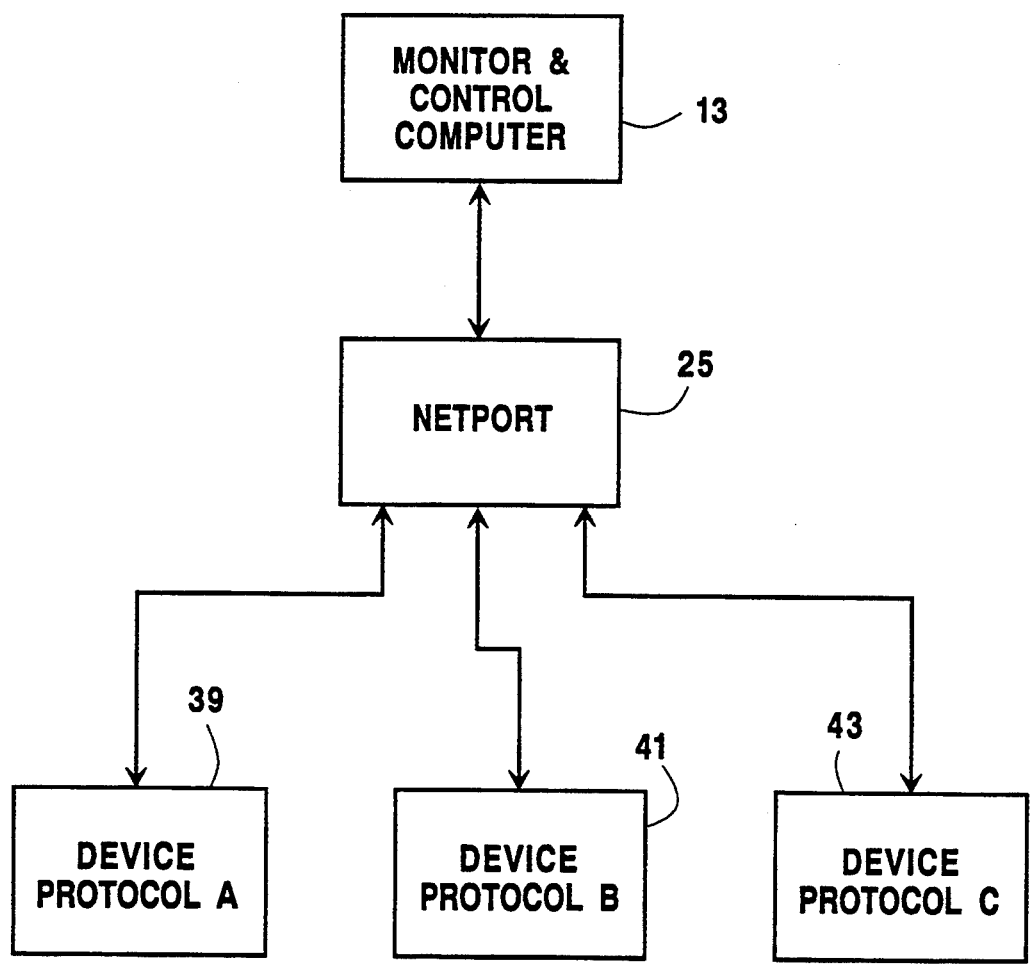
FIG. 1B is a simplified block diagram of the present invention.

FIG. 1 is a schematic diagram of the open architecture for the Facility and Gas Management System 11 (herein after "Management System") constructed in accordance with one embodiment of the present invention. In its most basic form, the Management System 11 (FIG. 1B) comprises two simultaneously operated processors, including a first master or host CPU 13 and a second CPU 25 (hereinafter referred to as "Netport 25") which are connected together for monitoring and controlling a plurality of data sources 39, 41 and 43. The host CPU 13 includes an I/O interface 13A, a control interface 13B and a graphic interface 13C.

In the preferred embodiment of FIG. 1B, the host CPU 13 is a stand alone IBM or IBM compatible PC having at least a minimum processing power of an Intel 386 or its equivalent microprocessor and preferably an Intel 486 microprocessor for operating in the Microsoft Windows ® environment. It is understood, however, that the invention is not to be construed as limited only to PC-based systems, but may also be practiced in any convenient platform including but not limited to a UNIX ™ workstation or mainframe system. The host CPU 13 is also provided with standard off-the-shelf software packages and preferably includes a spreadsheet program for generating report documents and a graphic display program for creating of a series of user-definable generic screen displays, some examples of which are shown in FIGS. 2A–2D. Each screen display is preferably tailored to show desired information concerning any data source or piece of process equipment to be controlled and/or monitored by the Management System 11.

A user interface 15, typically comprising a monitor, keyboard, and/or mouse, is connected to the host CPU 13 in the known way and cooperates with the graphic and control interface to provide an easy to use graphical user interface (GUI). The host CPU 13 also includes a number of ports 17, 19, 21 and 23. At least one of the ports, port 19 in the example shown, is connected an appropriate connector 26 to port 27 of the netport 25. In the preferred embodiment, the connector 26 is an RS 232 connector.

The netport 25 is a multi-ported processor which is used to interface a plurality of data sources collectively designated at 38, each of which may use different communications protocols, to the host CPU. In this way, the netport 25 functions as a black box protocol converter for converting any device output from a data source, such as for example a programmable logic controller (PLC), into usable and displayable data at the host CPU 13 but also includes program means (see e.g., the flow diagrams of FIGS. 4–7) for intelligently scanning and ranking important status information received from each data source 38 before it is communicated to the host CPU 13.

In the embodiment shown, the netport 25 includes four additional network ports 31, 33, 35 and 37. Each port 31, 33, 35 and 37 has an intelligent node associated therewith for handling data exchange with a particular I/O device or PLC controlled piece of equipment. Ports 35 and 37 are connected to a first data source comprising a gas cabinet controller 39 which includes both high speed and low speed network. An example of such a gas cabinet controller having dual speed network is the Sure-Purge TM 2 automatic gas purge system manufactured by Prax Air, Inc. of Santa Clara, California. The PLC for the Sure-Purge TM 2 utilizes an OPTO 22 hardware protocol for its high speed network and a proprietary protocol for handling analog information associated with the low speed network. Serial port 33 may be connected by a party line network 40 to a second group of like data sources comprising a plurality of PLCs or a PLC network 41 in a manner similar to the connection of the prior art PLC network 18a–18d to the host CPU 12 in FIG. 1A. The ports 31, 33, 35 and 37 may be either serial or parallel depending on the requirements of the connected piece of hardware. For this example, the devices on the PLC network 41 utilize a different protocol, such as for example, SECS II protocol. Optionally, any other digital or analog output device 43 may be connected to the netport 25 at serial port 31 as a third type of data source.

Redundancy may be built into the network by adding a second host CPU 45 for connection to the netport 25 at port 29.

The respective communication links 26, 44 from the primary and secondary host CPU's 13, 45 to the netport 25 are preferably made via an RS 232 interface connection (for the case where the host CPU is an IBM PC or IBM compatible machine), or depending upon the distance of the connection, a conventional RS 422 interface connection with appropriate hardware conversion equipment may be used.

Also connected to the host CPU are at least two printers 49 and 51, one of which is preferably a character printer and the other of which is a graphics printer. The printers 49, 51 are provided for report generation. The host CPU 13 includes port 17 for connection by a modem 47. Connecting a modem to the Management System 11 allows monitoring and control from remote sites. Modems may also be used to connect the Management System to suppliers for placing orders for gases and other consumables. Modem operation preferably requires a security code. Multiple modems may be installed depending upon hardware availability. In addition, an entire remote system 53 operating on a different platform, such as mainframe or minicomputer based systems, may be networked to the host CPU by an Ethernet link 52. Alternatively, a second netport 55 may be interfaced with another port 23 or the host CPU 13. Each netport 25, 55 performs the following three tasks:

1. Scanning each of its communication ports and gathering data concerning the status of each gas cabinet, piece of process equipment, or other output device connected thereto;
2. Ranking the alarms generated by each gas cabinet, piece of equipment or device; and
3. Storing in memory the status information for each gas cabinet, piece of process equipment or device.

All information, whether in digital or analog form, received by the netports 25, or 55 from the data sources 38 are stored at specific address locations in memory. The netport 25 includes emulation means whereby all the individual addresses corresponding to different output devices connected at the other end of the netport 25 appear as a row of OPTO 22 or other similar protocol blocks such that the pure data is communicated directly over RS 232 connection 26 to the host CPU 11 whereby this information is then imported directly into the visual screen displays set up by the user.

Figure 2A:
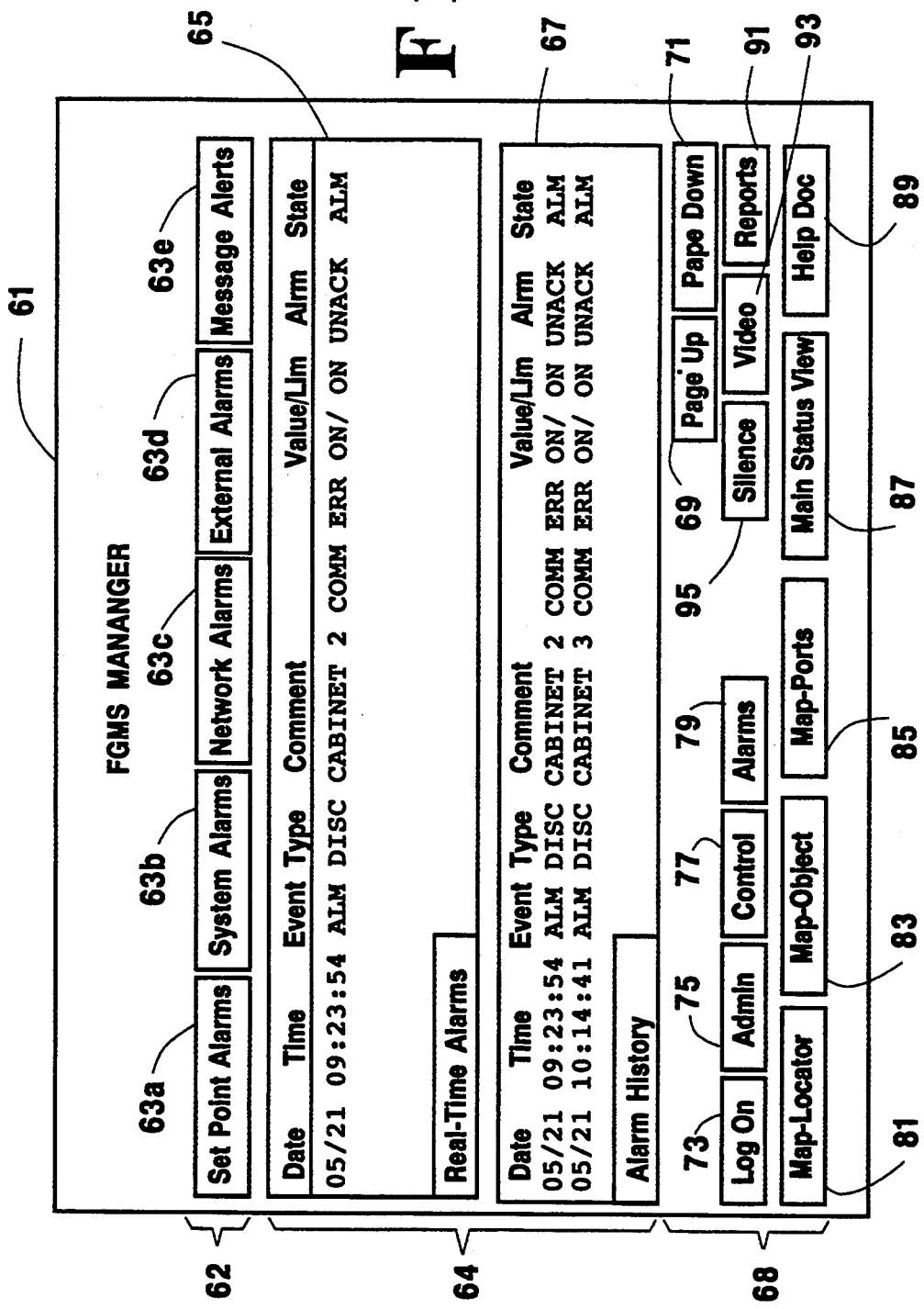
FIGS. 2A-2D are a series of graphic representations of selected exemplary screen displays used in the present invention.

With reference to FIG. 2A, there is shown an exemplary graphical representation of an FGMS Manager window 62 of the present invention which is displayed to a user of the host CPU 13 (i.e., via user interface 15 and graphic interface 13c).

The FGMS Manager window 61 comprises a top region 62 containing a plurality of alarm indicators or buttons 63a–63e, a middle region 64 containing two data fields of alarm information 65, 67 and a bottom region 68 containing a plurality of function buttons 69, 71, 73, 75, 77, 79, 81, 83, 85, 87, 89, 91, 93 and 95. It is understood that the particular layout of the alarm indicators in top region 62, data fields in middle region 64 and function buttons in bottom region 68 contained within the FGMS Manger window 61 shown in FIG. 2A and described above as well as any other window used in the invention, may be tailored specifically to a particular user's needs and requirements. Preferably, for reasons of security, the function buttons of the FGMS Manager window are accessible only after the user has successfully completed a conventional "log on" procedure using appropriate user codes, passwords, etc.

In the preferred embodiment, the FGMS 11 provides six alarm indicators which include the five buttons 63a–63e shown and a sixth log On Alarm indicator (not shown). The alarm indicators allow the user to respond to and manage information pertaining to various types of alarms. When an alarm is generated, the area immediately beneath the associated alarm indicator or button changes from green (the off state) to red (the active alarm state), indicating that a message is waiting. In addition, an audible sound may be generated.

The definitions for the six alarms are as follows:
(1) Set Point Alarms (button 63a) indicate that set point thresholds are exceeded in either a negative or positive region;
(2) Systems Alarms (button 63b) indicate shutdown or equipment failure;
(3) Network Alarms (button 63c) indicate, as evaluated through a network expert program, whether the network is functioning correctly;
(4) External Alarms (button 63d) indicate critical alarms as received by sensors which monitor and detect the occurrence of an emergency which may require shutdown procedures such as toxic gas leaks, fires, earthquakes, etc.;

(5) Message Alerts (button 63e) indicate maintenance messages or other messages which may be generated if some anomaly occurs during regular system communications; and (6) Log On Alarms (button not shown in the FGMS Manager window 61) allow a user to view and monitor possible system access problems relating to security.

Immediately below the top region 62 containing the alarm indicators are two alarm information fields referred to as the Real-Time Alarms field 65 and the Alarms History field 67. Each alarm information field 65, 67 accommodates a display group of up to four lines of alarm occurrences. The Real-Time Alarms field 65 shows all types of alarm occurrences in the sequence in which they are generated. The information headings for each field are user-definable and preferably include information regarding the date, time and event type for each alarm occurrence as well as supplemental information concerning a comment on a specific event, such as cabinet name or number; whether a set point value or other limit value has been exceeded; and the alarm status, i.e., whether the alarm is active, acknowledged, unacknowledged, or has been returned to normal.

The Alarm History field 67 includes the same information as the Real-Time Alarms field 65, but is also a collection of alarms which have been generated and acknowledged or are active, active acknowledged, or nonactive. By using the Page Up and Page Down buttons 69, 71, a user can page through the collection of alarms in the Alarm History field 67 to view a period or shift for which data is to be logged. As before, color changes in the information fields may be used to quickly aid the user in understanding the alarm history. For example, alarms highlighted green may indicate active alarms, while alarms highlighted red may indicate active, acknowledged alarms and alarms highlighted blue may indicate nonactive alarms that have been returned to normal.

To acknowledge a particular alarm, i.e., where one or more of the alarm indicator buttons 63a–63e has changed from green (alarm inactive) to red (alarm active) and/or where an alarm sound has been generated, the user first selects the button corresponding to a desired alarm type to bring up a window for that alarm. To simplify programming tasks associated with the creation of individualized screen displays, the invention provides a single alarm window screen display generic to each of the five alarm indicator buttons 63a–63e.

The Control function button 77 of the FGMS Management window is used to control system start up and shut down functions, such as for example, enabling a user to perform a shut down from a remote location and setting a specified port on the netport-scanner 25 to the on or off position. Selection of the Control function button 77 generates a control window (not shown) which includes a number of user selectable buttons for performing various functions. Other user-definable function buttons may be included as desired. The Alarms function button 79 enables the user to directly invoke the same window for each of the alarm types as an alternative to acknowledging the alarm by the selection of a particular alarm indicator button 63a–63e. The Silence function button 95 may be selected to set a provided audible alarm (not shown) to an on or off mode. The Video function button 89 enables the user to view the system on up to four screens whereby one screen may be used as a video camera monitor (not shown) to see where an alarm is being generated. By way of example, one monitor may be used to show the alarm information while another monitor may visual show the alarm area. The Reports function button 91 generates hard copy reports of alarm data from previous shifts on the printers 49 and 51.

Figure 2B:
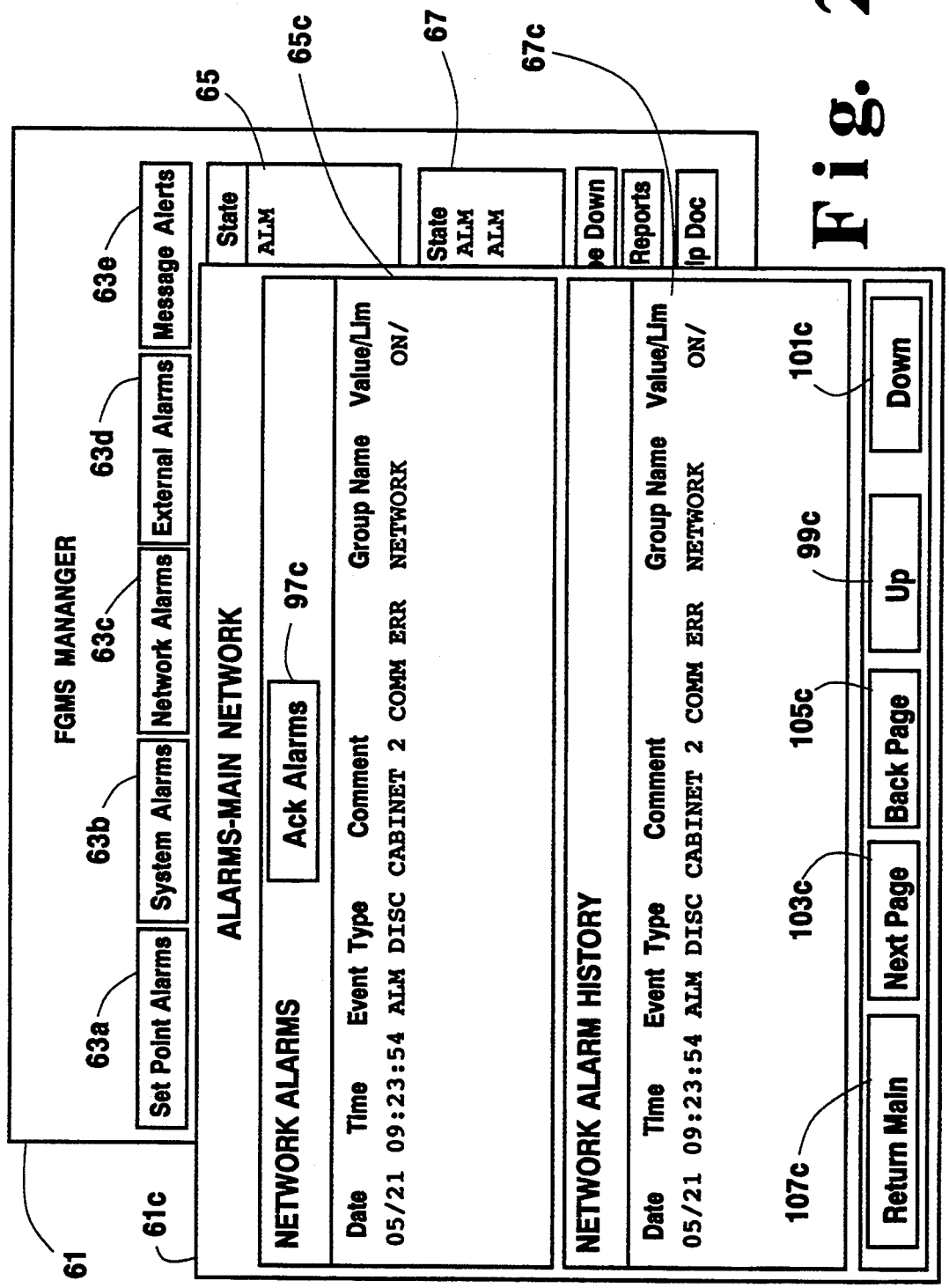

In the example window shown in FIG. 2B, a pop up window 61c identified as "Alarms-Main Network" overlays the FGMS Manager window 61 in response to user selection of the Network Alarms button 63c. The Alarms-Main Network window 61c includes a Network Alarms field 65c (having a format similar to the Real-Time Alarms field 65 of the FGMS Manager Window 11) which shows all network alarms as they occur. A network alarm is acknowledged by selecting the Ack Alarms button 97c located in the top center of the Alarms-Main Network window 61c. Once acknowledged, the alarm sound stops, the line of information in the Network Alarms field 65c changes color from red to green and is also placed in the Network Alarm History field 67c.

Selection of the Up and Down function buttons 99c, 101c permits the user to scroll up or down within the Network Alarm History field 67c as desired to view current and previous alarm occurrences. The Next Page button 103c invokes the next type of alarm in the sequence of alarm indicator buttons, such as from the Network Alarms 63c to the External Alarms 63d. The Back Page button 105c invokes the previous alarmtype in the sequence of alarm indicator buttons such as from the Network Alarms 63c to the System Alarms 63b. Selection of the Return Main button 107c returns the Alarms-Main Network Window 61c to the FGMS Manager window 61.

As mentioned above, a similar procedure is followed for acknowledging the four other alarm indicators (Set Point Alarms 63a, System Alarms 63b, External Alarms 63d and Message Alerts 63e) indicated at the top region 62 of the FGMS Manager window 61. Since there is no alarm indicator to show that a Log On Alarm has been reported, a Log On Alarm is acknowledged by first selecting the Alarms function button 79 located in the bottom region 68 of the FGMS Manager window 61. This brings up a default alarm window set up in the generic alarm window format and shows active alarms flashing in red in the upper Alarm field and all previously acknowledged Log On Alarms in a lower Alarm History field. As before, the Log On Alarm is acknowledged by selecting a center top Ack Alarms button (again, this button, like the data fields dial function buttons is generic to each display for the six alarm types) after which the Log On Alarm is then recorded to the lower Alarm History field, the alarm sound stops and the alarm state changes from red to green. As described above, the user may sequence through the six alarm types by selecting the generic Next Page and Back Page function buttons.

Figure 2C:
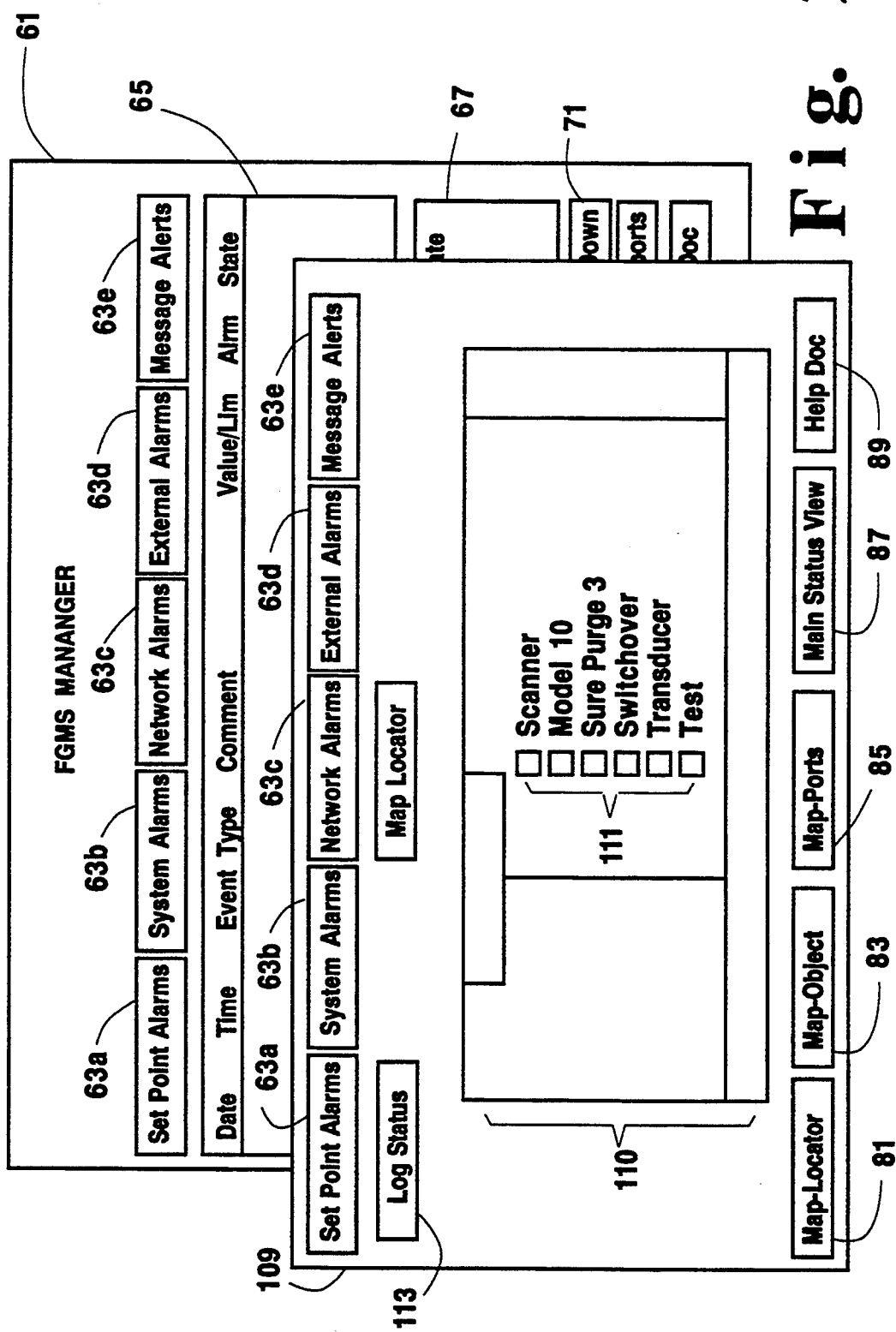

FIG. 2C illustrates an example of a MAP Locator window 109 which is invoked to overlay the middle region 64 of the FGMS Manager window 61 upon a selection of the MAP Locator function button 81 located at the bottom of the FGMS Manager window 61 in FIG. 2A. The MAP Locator window 109 shows a user-definable pictorial representation of the complete facility including the make, model and location of each piece of equipment contained within the facility. In the example MAP Locator window 109 shown, the make and model of each piece of equipment and device is designated generally in the middle window portion by reference numeral 111. The MAP Locator window further includes the top row of alarm indicator buttons 63a–63e and the bottom most function buttons 81, 83, 85, 87 and 89 from the FGMS Manager window 61. To obtain status information concerning a particular piece of equipment or device, the graphic symbol for that piece of equipment or device is selected thus invoking a new window for that device which, in turn, over lays the middle region 110 of the MAP Locator window. To exit this window 109, the user selects the Log Status button 113 to return to the FGMS Manager Window 61.

Figure 2D:
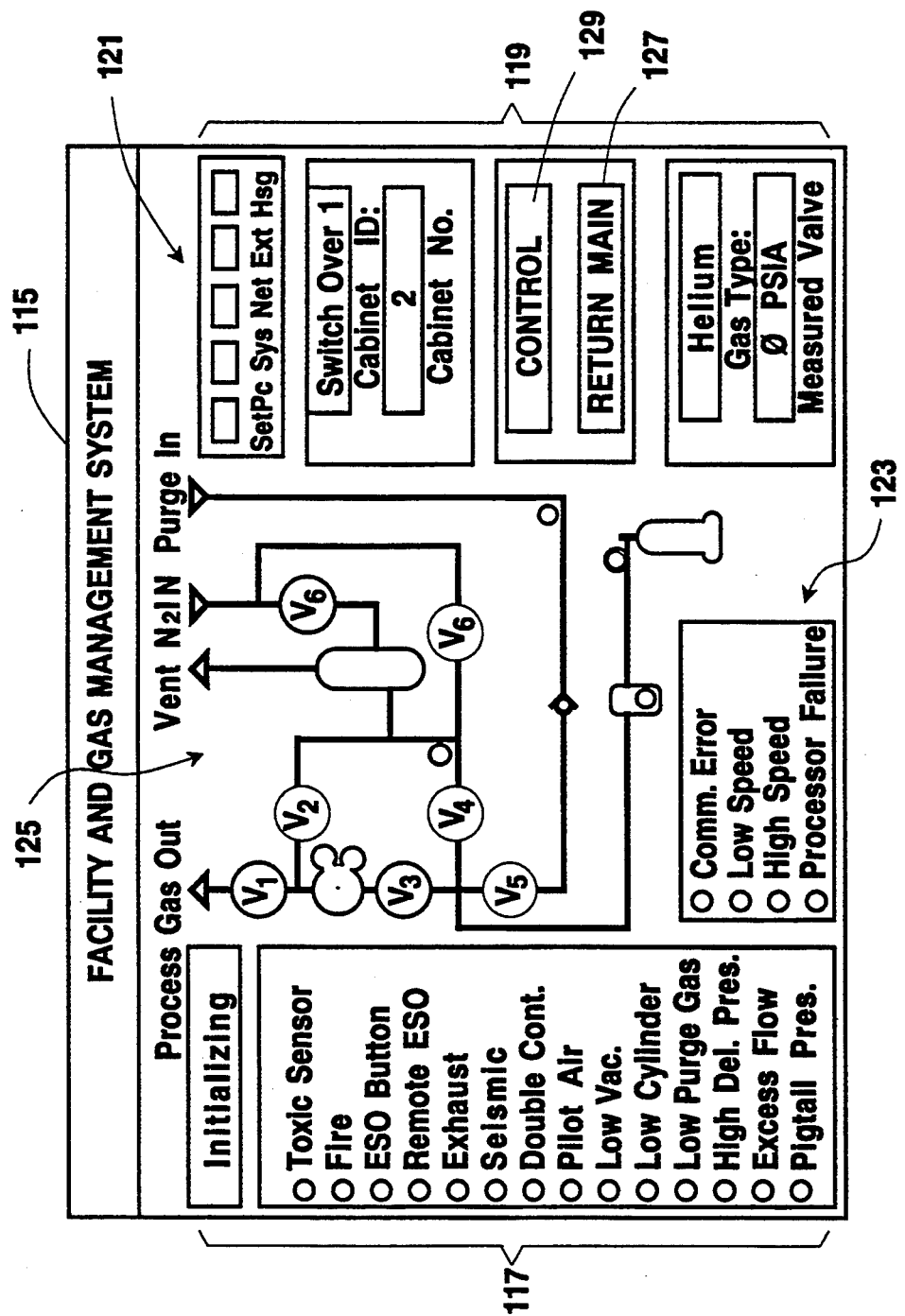

FIG. 2D is a pictorial representation of a window 115 which shows a detailed configuration layout for a gas panel being purged corresponding to a piece of equipment selected from the equipment/device listing 111 of the MAP Locator window 109 (in this case the Sure Purge 2 ™ gas cabinet controller).

The layout is divided into four main areas of user-definable information. On the left side region 117 of the layout 115 is a list of components in the configuration showing alarm conditions for panel and external alarms pertaining to an entire gas cabinet unit, for example. On the right side region 119 of the window 115 are fields pertaining to general gas cabinet information including a top right portion 121 in which the alarm types generated are indicated. Bottom middle region 123 indicates general communications failures and related specific types of communication errors. The center portion 125 of the window 115 shows a graphical depiction of the configuration including symbols for components, lines and valves. To exit the configuration layout window 115, the user simply selects the Return Main function button 127 located in the right side region 119.

Referring back to FIG. 2A, selection of the Map-Object function button 83 brings up a window very similar to the MAP Locator window shown in FIG. 2C and provides a user-definable function replacing special objects in the window which are to be monitored. Such objects may include [bulk] gas status, chemical system, or test program for a long term duration. As before, the Map-Object window preferably includes a Log Status button which is selected to return to the FGMS Manager window 61.

Similarly, the Map-Ports function button 85 brings up a window which provides an illustration of all cabinets or other process equipment within the system and allows the user to obtain more information about a specific cabinet or piece of process equipment. The Map-Port function button 85 also allows the user to obtain information directly about any cabinet and/or piece of process equipment in sequential order without using the other Map function buttons. The Main Status View function button 87 is a Map function that allows the user to view a predefined control panel to show possible special status for facility. The Help Doc function button 89 provides on-line reference information about the particular screen or function, or both. Help information is preferably defined by the user.

Each of the windows accessible by the MAP Locator function button 81, the Map-Object function button 83 and the Map-Ports function button 85 also include a Control function button (see for example, the Control function button 129 of the Configuration Layout window 115 of FIG. 2D) which permits access to a Control window (not shown) for obtaining additional information about a piece of equipment or device selected from the list 111 of the MAP Locator window 109 (See FIG. 2C).

In the preferred embodiment of the invention, the control window preferably displays analog information pertaining to critical reduction or increase in pressure for the gas cabinet controller. The Control window also preferably includes a graphical representation of analog inputs to the system such as power supply voltage, power fluctuation over a specified amount of time, or changes in pressures, indicating critical pressure reductions or critical pressure increases. Further, cabinet information such cabinet identification, cabinet number, gas type and measured pressure value (in PSIA) may also be displayed in the Control window. The Control window preferably includes a plurality of other function buttons to perform additional system-level operations such as shutting down a particular cabinet controller, or purging a gas cabinet from a remote site. Additional function buttons may be provided to selectively restrict communication between set points and the computer (either host CPU 13 or the netport 25) over the network, or for updating the screen with information received by the system since the last time the screen was reactivated, or selectively restricting input (either manual or from an external device such as a bar code) for performing certain operations such as for example purging the front panel device of a gas cabinet.

The system administrative functions of the invention are accessed on a pop up menu associated with the selection of the Admin function button 75 of the FGMS Manager window 61. The administrative window (not shown) preferably includes functions which permit a user to load and restore security; allow or restrict input using an input device such as a bar code; print a security report; set system time and date; generate a back up of the system to the network; and to restore the database.

Figure 3:
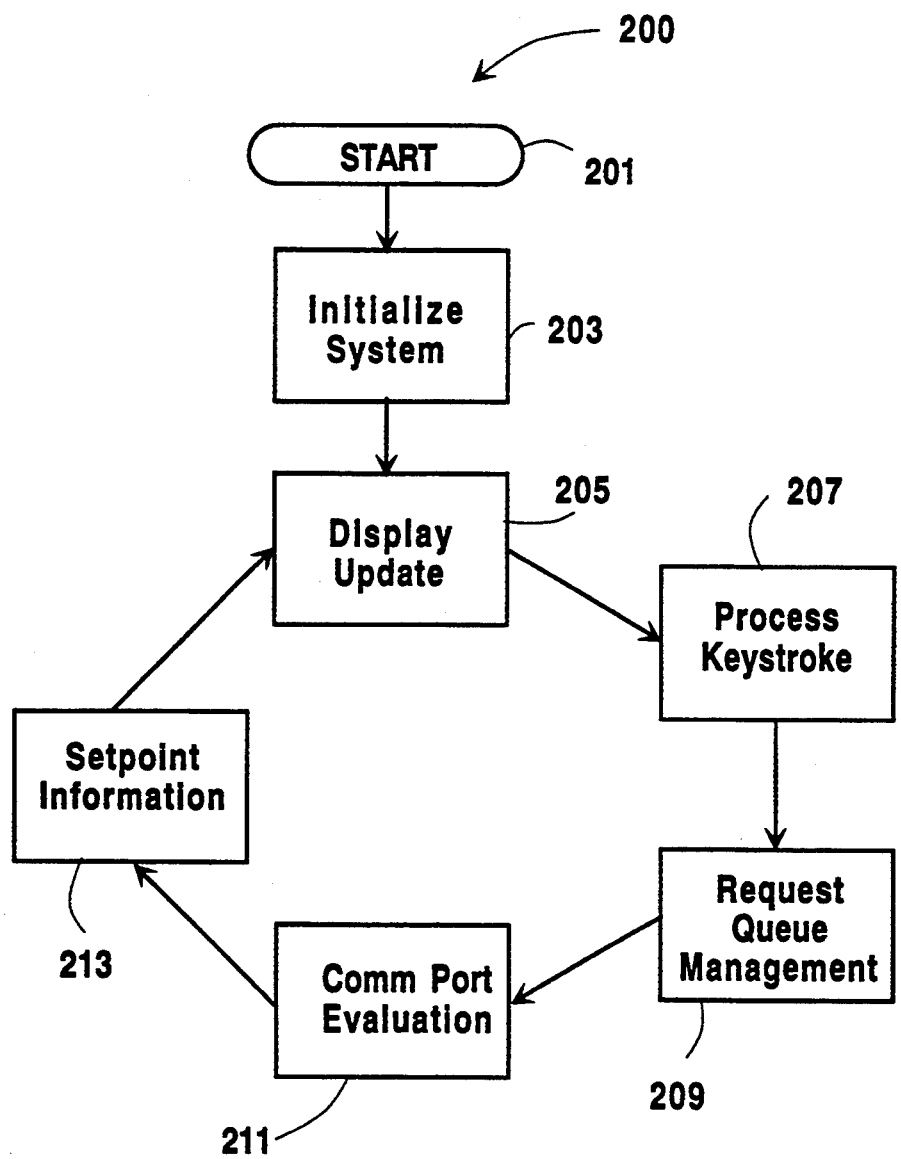
FIG. 3 is a flow diagram illustrating a main process loop of the netport, multi-ported processor.

FIG. 3 shows an overall flow diagram of the process steps for the Main Loop program 200 for the netport processor 25 shown in FIG. 1. In the preferred embodiment, the Main Loop program 200 may run on any IBM PC or compatible computer regardless of the bus type and serial card interface, however the hardware configuration options must be known at the of compilation. The Main Loop program starts at step 201 when the user accesses the host CPU directly by the user interface 15 or remotely by a modem 47 (see FIG. 1). At the Initialize System step 203 the network configuration is read in accordance with the known technique such that each port of the netport 25 (FIG. 1) is configured for its particular connection (i.e., external data source or interface connection to a host CPU) and all internal variables such as queues and timers are set to zero.

Steps 205 and 207 are provided to the Main Loop program 200 of the netport 25 for maintenance and de-bugging purposes. For instance, at step 205 a monitor may be plugged into the netport 25 to display updated information on the status of the netport program and at step 207 a keyboard may be connected to the netport 25 to de-bug or reprogram any glitches found.

At step 209, a Request Queue Management routine is provided for performing all the maintenance for the shut down queues corresponding the various protocol-sensitive networks within the system (to be described in more detail below). The Request Queue Management routine determines when the netport receives a request from the host CPU to initiate a control function of a particular connected device or data source, such as, for example, to perform a shutdown on a gas cabinet, perform a gas cylinder purge sequence for a particular gas cabinet, lock out a gas panel, etc., and will determine where that particular device or data source (i.e., gas cabinet) is located and will attempt to execute the particular request. All serial communications between the netport and the particular connected serial device or data source is handled asynchronously with interrupts.

At step 211, each comm port, i.e. ports 31, 33, 35 and 37 of the netport 25, are evaluated to verify that the network protocol for each particular connected device will perform the desired function for that device. In the preferred embodiment of the present invention, the netport 25 handles various different network protocols including the previously mentioned high speed (i.e., OPTOMUX®) and low speed network protocols of the Sure Purge TM 2 gas cabinet controller, and a third protocol generically referred to as the device network protocol. In one embodiment, the device network protocol handles communication back and forth between a bar code reader (I/O device 43 in FIG. 1) which may be used during cylinder change over procedures at a gas cabinet.

At step 213, Set Point Information such as analog values from a gas cabinet are cycled through by the netport 25. If any analog value is above or below a set point, the set point alarm is enabled for that channel and the set point alarm bits are enabled. One gas cabinet is checked for set point information for each pass of the Main Loop 200. An advantageous feature provided by the Main Loop program 200 is that once the netport has been configured for handling the defined network protocols and device types, the set point threshold may be easily reconfigured by the user on the host CPU 13 without need for reconfiguring the netport 25.

Figure 4:
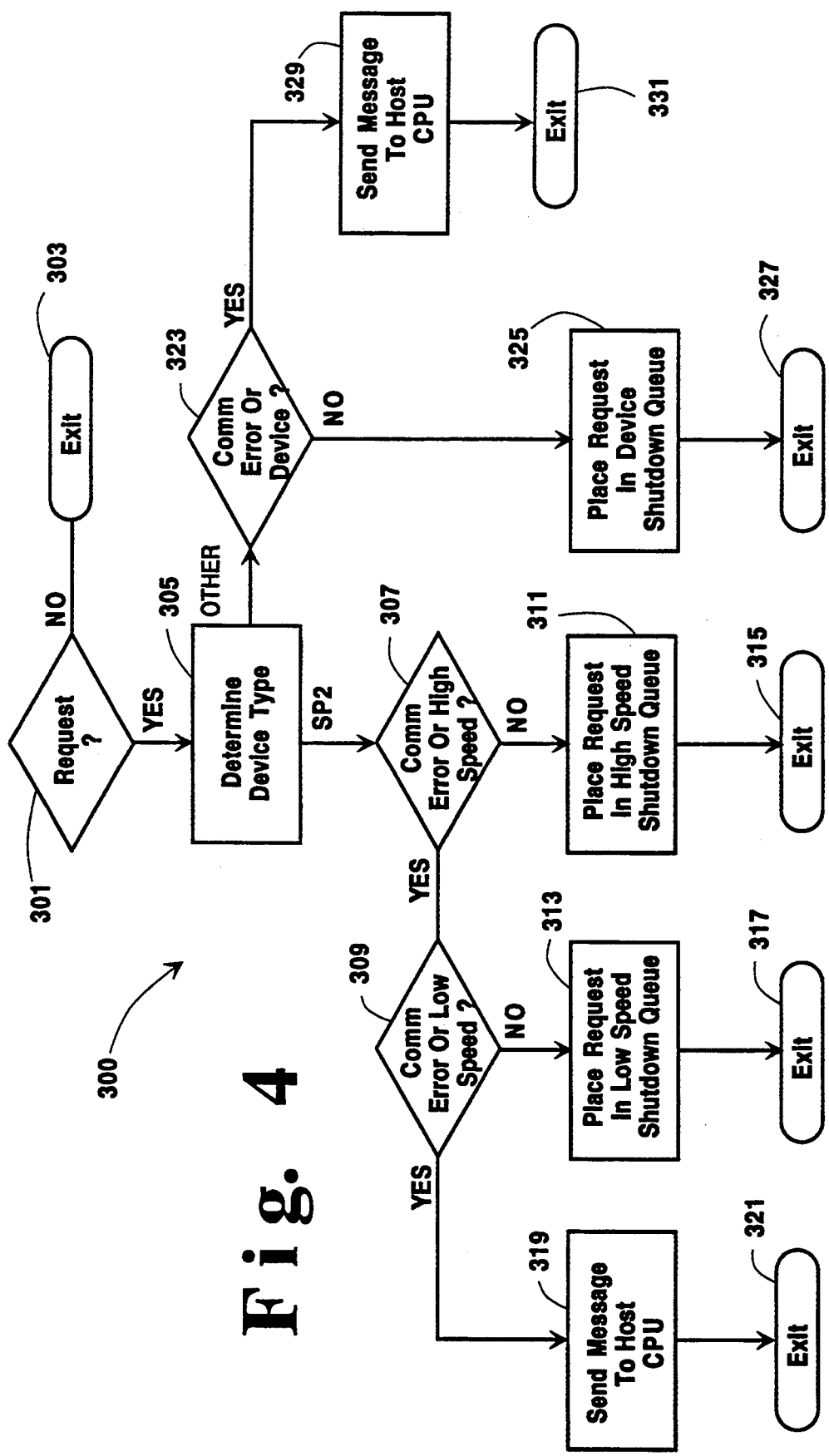
FIG. 4 is a flow diagram illustrating the Shut Down Queue Management function block of FIG. 3.

FIG. 4 shows a flow diagram of a shut down queue management routine 300 which corresponds to the process step 209 of FIG. 3. All requests initiated by user via the user interface 15 for shutting down a particular piece of equipment are placed in the master queue at 301. Where no shut down requests are present, the shut down queue management routine exits at 303. Where a shut down request is present in the master queue 301, the shut down management queue routine 300 then determines the device type at 305 for placement of the shut down request into the appropriate one of sub queue 311, 313 and 325.

If, for example, the device type at 305 is determined to be a Sure Purge TM 2 gas cabinet controller, the shut down management queue routine then determines at 307 and 309 whether the shut down request is to be placed in the high speed shut down sub queue 311 (corresponding to the high speed network protocol) or the low speed shut down sub queue 313 (corresponding to the low speed network protocol), after which the shut down queue management routine exits at 315 or 317, respectively. A shut down request for placement in the high speed sub queue 311 has priority over a shut down request for placement in the low speed shut down queue 313 since data communication over the high speed network is faster than the low speed network for the Sure Purge TM 2 gas cabinet controller. If a communication error occurs at both 307 and 309, a communication error message is sent to the host CPU at 319 after which the shut down queue management routine exits at 321. A communication error may indicate for example, that either the high speed or low speed network did not respond to a previous poll from the netport 25.

If at 305 the device type is determined to be some device other than the Sure Purge TM 2 gas cabinet controller, then the device type is verified at 323 for placement in the device shut down sub queue at 325. If, on the other hand, a communication error is generated, it is sent to the host CPU at 329. In either case the shut down queue management routine will then exit at 327 or 331, respectively.

Figure 5:
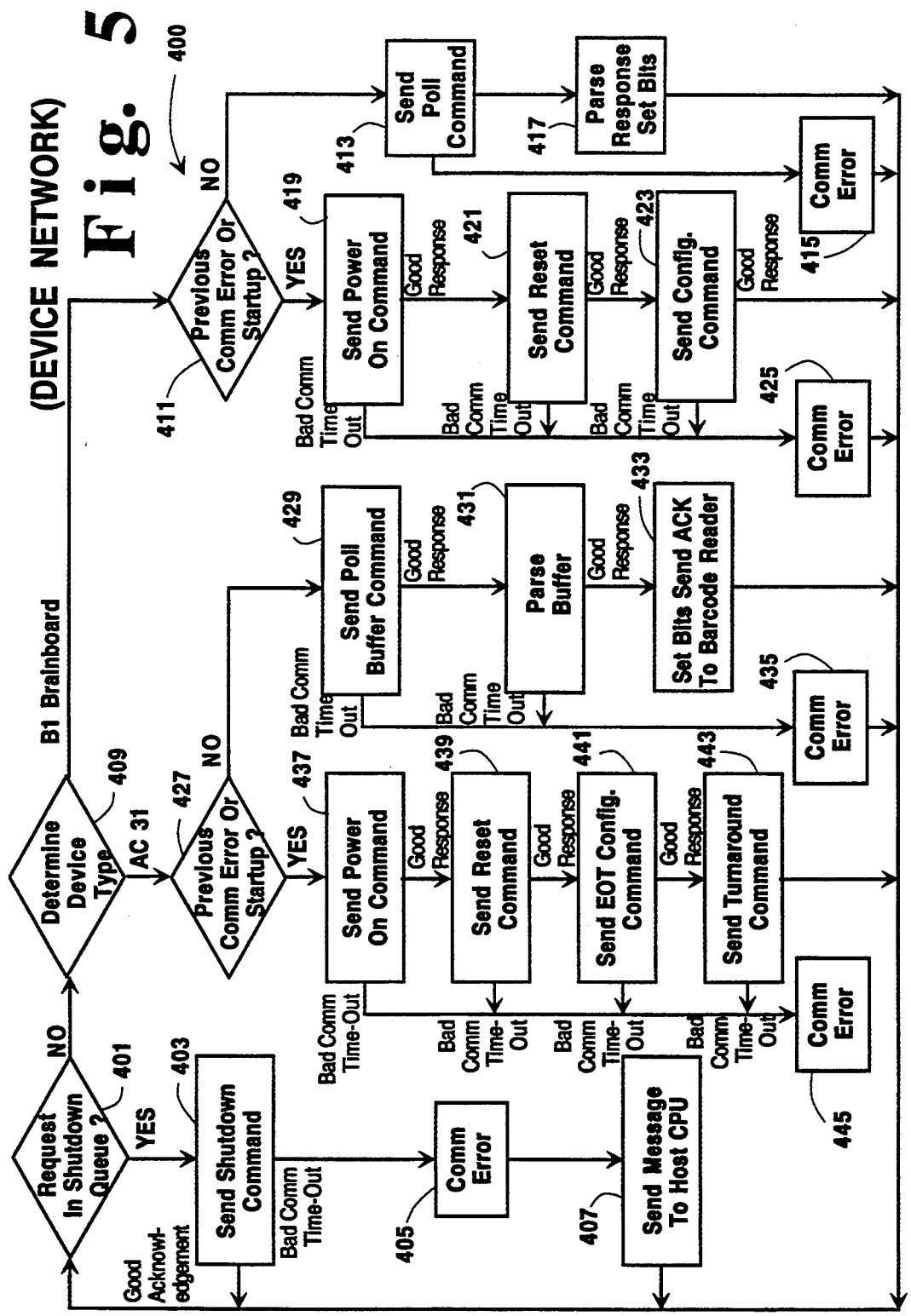

Referring now to FIG. 5, there is shown a state diagram 400 for the device network corresponding to any data source connected to the netport 25. The first decision occurs at 401 to determine whether a shut down request has been placed in the device shut down queue 325 of FIG. 4. If so, a shut down command is generated at 403 which is either acknowledged as a good command or is returned to the first decision at 401. If not, a communication error is established with that device at 405 and a communication error message will be created at 405 which signifies that this device is having communication problems. An alarm will then be generated and a message will be sent to the host CPU at 407.

If at 401 no shut down requests are in the shut down queue, the device type is determined at 409. For purposes of illustration only, the device types shown in FIG. 5 include an OPTO 22 piece of hardware designated as "B1 Brain Board" or another OPTO 22 board designated as "AC31". Where the device type is determined to be a B1 Brain Board, the next decision at 411 determines whether there was a previous communication error or whether this is a start up condition. If neither condition is present, a command for polling the hardware for more status information is sent at 413. If a communication or a time out error occurs, a communication error bit will be set and returned to the beginning of the state diagram at 415. Otherwise, if good information is received at 413, then at 417 the poll command will be parsed and an appropriate bit will be set in the internal data base of the netport 25. If at 411 a previous communication error has occurred or if this is a start up condition, then a power on command specific for the hardware is sent at 419 after which reset and configuration commands are sent at 421 and 423, respectively, for each good response, otherwise a communication error is generated at 425.

A similar state sequencing procedure is followed if the device type is determined to be an AC31 OPTO 22 board. The AC31 OPTO 22 board is a semi-intelligent network serial adapter which acts as a buffer for receiving serial communications from the netport while talking to the remote connected device. In the present invention, the contemplated remote device is a bar code reader which may be used for inventory control. However, it is understood that other serial devices, such as a printer for example, may be supported by the AC31 OPTO 22 board. If, at 427 there is no previous communication error and this is not a start up condition, the buffer of the AC31 is polled at 429. If a good response is received, the AC31 buffer is parsed at 431 and an acknowledgement is sent back to the remote device (e.g. bar code reader) at 433. If, at any time a bad response is generated, a communication error message is sent at 435.

If at 427 a previous communication error has occurred or this is a start up condition, the state diagram cycles through the power on, reset, configuration and turn around commands at 437, 439, 441 and 443, respectively. This sets the appropriate bit in the internal data base in the netport for sending an acknowledgement to the bar code reader or other serially connected device associated with the AC31 OPTO 22 board. If, at any one of these commands a bad response is received, a communication error message is sent at 445.

Figure 6:
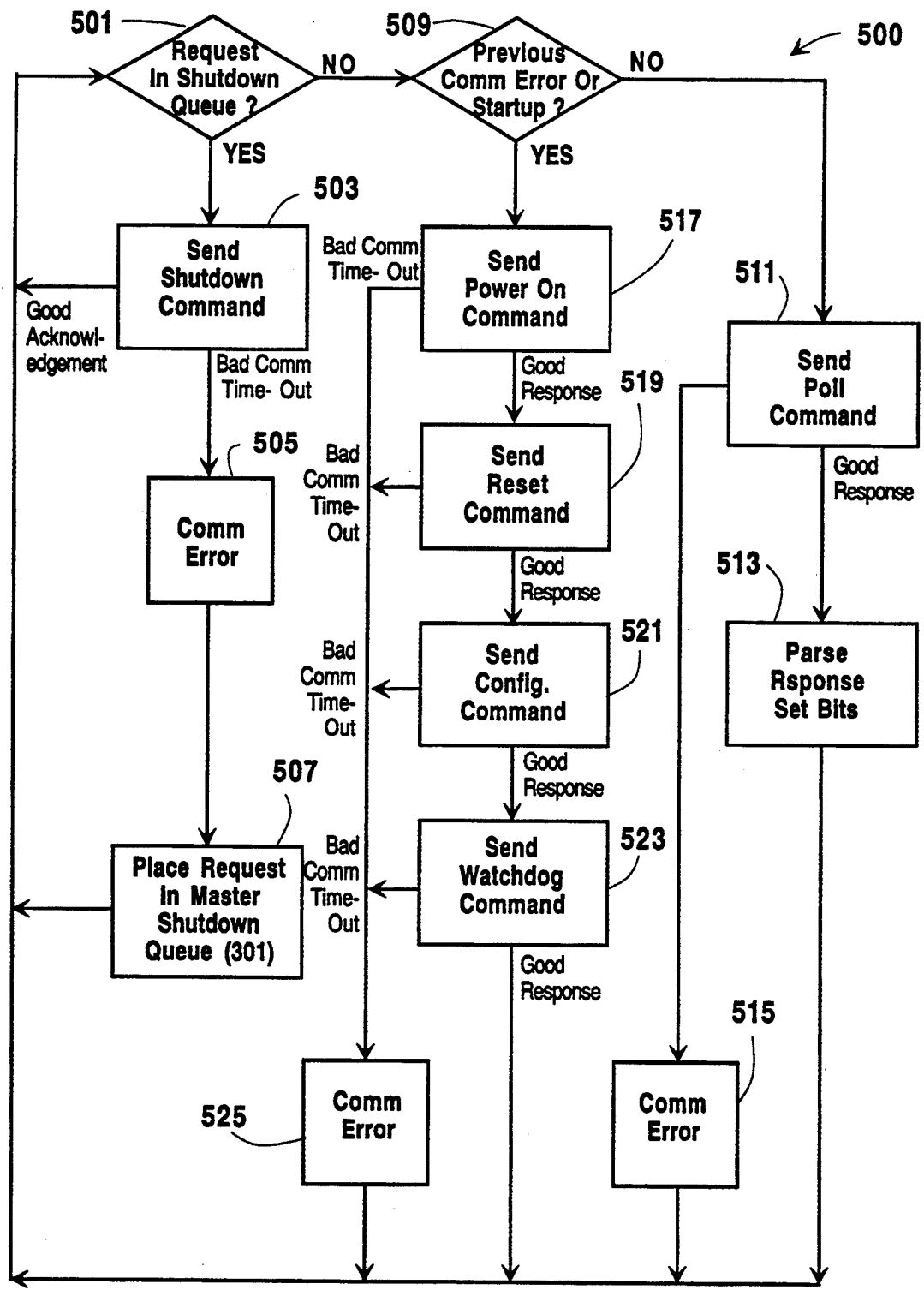

FIG. 6 shows a state diagram 500 for a high speed network of the netport 25 in the present invention. This state diagram recognizes the hand shake to an externally connected data source using a high speed network protocol. The state sequencing for the high speed network 500 is very similar to that for the device network 400 of FIG. 5. At 501, the netport first looks for a shut down request received in the high speed shut down queue 311 (See FIG. 4). If a shut down request is present at 501, then a shut down command is sent at 503. If the shut down command is successfully executed, it is acknowledged as good, otherwise a communication error is generated at 505 and at 507 a shut down request is then placed in the master shut down queue 301 of FIG. 4. If at 501 no shut down request is present in the high speed shut down queue (311 of FIG. 4) then at 509 the netport looks to see whether there was a previous communication error or whether this is a start up condition. If none of these conditions are present, then the high speed network is polled at 511 and a good response is parsed and acknowledged at 513. A bad response to the polling command generates a communication error at 515.

If at 509 a previous communication error exists or this is a start up condition, then the high speed network is initialized as before by the power on, reset, configuration commands 517, 519 and 521, respectively. In addition, the state sequence for the high speed network further includes a watch dog command at 523 to initiate a further monitoring step for providing additional reliability. The watch dog is preferably a simple known circuit for observing specific actions which take place inside the board for the high speed network. For example, if communications to the board are not complete within a specified period of time, a particular response will be generated which may be used to program additional safety measures into the system such that if the network should go down, the gas cabinet will be shut down within a predetermined period of time well within a predetermined safety margin. This is especially advantageous for use in a wafer facility wherein gas cabinets containing toxic gases require constant monitoring to insure reliability of operation and safety to workers. As before, any bad response to the power on, reset, configuration or watch dog command generates the communication error at 525. For added redundancy, multiple concepts of watch dog may be incorporated into the high speed network, or for that matter any network of the invention.

FIG. 7 shows the state diagram for the low speed network of the netport 25. The low speed network uses a different protocol for communicating with the gas cabinet than the OPTO 22 protocol used for the high speed network since the low speed network primarily handles data communication of analog set point information from a particular gas cabinet controller to the netport.

In addition to communicating shut down commands, the low speed network can also perform a remote purge or even a lockout of the gas cabinet panel using a bar code reader to provide additional security. At 601, the low speed network state sequence checks to see if a shut down request is present in the low speed shut down queue 313 (See FIG. 4). If so, a shut down command is sent at 603 and is either acknowledged as good or a communication error is generated at 605 which is then placed in the master shut down queue at 607. If, at 601, there is not a low speed shut down request present in the low speed shut down queue 313 then netport looks to see if a purge request has been made at 609. If yes, a purge command is sent at 611 where it is either acknowledged by the netport as a good response or a communication error is generated at 613 and is sent to the host CPU at 615. If at 601 and 609 no shut down or purge exists, a bar code request is checked at 617 and a panel lock/unlock command is sent to the bar code reader at 619 where it is either acknowledged as a good response or if not, a communications error is generated at 621 which is then communicated back to the host CPU at 625.

If at 625 a previous communication error is present or this is a start up condition, then the power on command is sent at 625 where it is acknowledged as a good response such that the panel unlock command is sent at 629. Otherwise a communications error is generated at 639. If at 625 no previous communication error is present then a poll command is sent at 631 whereby each cabinet is polled in sequence. Each poll command is then acknowledged and answered and bits are set at 633, 635 and 637, respectively. For bad responses at 633 or 635 a communications error is generated at 639.

The OPTO 22 network as used in the present invention simulates many digital and analog brain boards. The information that these simulated brain boards contain represent the status of the gas cabinet and other connected devices or data sources. The following is a list of OPTOMUX® commands supported by the OPTO 22 network.

A = Power Up Clear
B = Reset
F = Identify OPTOMUX Type
G = Configure Positions
H = Configure as Inputs
I = Configure as Outputs
J = Write Outputs
K = Activate Outputs
L = Deactivate Outputs
M = Read Status
J = Write Analog Outputs
K = Read Analog Outputs
L = Read Analog Inputs The definition of addresses and what each address represents is dependent upon the system's configuration.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. In a computer-controlled facility management system for centralized monitoring, analysis and control a plurality of pieces of process equipment each having protocol-sensitive data sources associated therewith, which system includes a distributed network of processors for dividing up processing tasks, including at least one user-interactive host processor having program means for graphical manipulation, analysis and display of process information data collected from said data sources, at least two of said data sources having different protocols so that data segments from one are arranged in a different order than data segments from the other, and wherein said host processor is coupled to at least one multi-ported processor which, in turn, is coupled to each of said plurality of data sources for input/output data communication therewith, an improved method for operating said multi-ported processor for real-time monitoring and control of said process equipment and the process information data relating to said plurality of data sources comprising the steps of:

a) sequentially polling, by means of the multi-ported processor, each of said plurality of protocol-sensitive data sources for status and alarm data;
   b) parsing the updated status and alarm data in to segments, by means of the multi-ported processor, for conversion to a common protocol;
   c) storing the parsed status and alarm data segments at individual address locations in a memory accessible by said at least one host processor, said individual address locations being ordered according to a protocol used by said at least one host processor; and
   d) causing said at least one host processor to access said address locations in order to retrieve status and alarm data in its protocol and to transmit requests to said plurality of data sources through said multi-ported processor to have said process equipment perform selected control functions in response to said parsed status and alarm data retrieved from said memory by said host processor.

2. A method as in claim 1 wherein said plurality of protocol-sensitive data sources comprise a plurality of protocol-sensitive device types and wherein said method further includes the steps of:
   a) determining a device type corresponding to a particular control function request; and
   b) placing a control function request for a protocol-sensitive device type into an appropriate one of a plurality of request sub queues, each sub queue having a corresponding network protocol, 3. A method as in claim 2 wherein at least one of said plurality of protocol-sensitive device types includes a dual network gas cabinet controller having a first high speed network for communication of digital data to said multi-ported processor and a second low speed network for communication of analog set point data to said multi-ported processor, and wherein a request sub queue for said high speed network has priority over a request sub queue for said low speed network during said step of placing a control function request into an appropriate sub queue.

4. A method as in claim 3 wherein said control function requests include at least one shutting down a gas cabinet, purging a gas cylinder, and locking/unlocking a gas cabinet.

5. A method as in claim 3 wherein said plurality of protocol-sensitive data sources includes at least one bar code reader, said method comprising the additional step of generating a gas panel lock/unlock control function request using said at least one bar code reader.

6. A method as in claim i wherein said alarm data includes a plurality of different alarm events and wherein said method further comprises the step of ranking said alarm events.

7. An interactive computer-controlled facility management system for real-time data gathering and analysis of process information relating to a plurality of pieces of process equipment each having protocol-sensitive data sources associated therewith and for selectively controlling operational functions of said process equipment, at least two of said data sources having different protocols so that data segments from one are arranged in a different order than data segments from the other, comprising in operative combination:

a) at least one multi-ported processor means, coupled to each of said data sources, for sequentially polling each of said data sources for status and alarm data, updating said polled status and alarm data, parsing said updated status and alarm data in to segments for conversion to a common protocol and storing said parsed status and alarm data segments at individual address locations in a memory means coupled to said multi-ported processor means, said individual address locations being ordered according to a certain protocol; and
   b) at least one host processor means using said certain protocol and coupled to said at least one multi-ported processor means for accessing said first memory means to retrieve current status and alarm data segments in its protocol for a selected data source and for generating requests to said selected data source for its associated process equipment to perform a control function in real-time in response to said status and alarm data retrieved from said first memory means.

8. An interactive computer-controlled facility management as in claim 7 wherein said multi-ported processor means further includes means for identifying a control function request generated by said host processor means, determining a corresponding data source by device type and communicating said control function request to said determined data source prior to polling said determined data source for updated status and alarm data.

9. An interactive computer-controlled facility management as in claim 8 further including display means coupled to said host processor means for graphical display of said retrieved status and alarm data.

10. An interactive computer-controlled facility management system as in claim 8 wherein said host processor includes means for generating reports on said updated status and alarm data.

11. An interactive computer-controlled facility management system as in claim 8 wherein:
   a) said plurality of data sources include at least one dual network protocol gas cabinet controller and at least one bar code reader;
   b) said control function requests include shutting down a gas cabinet, purging a gas cylinder, locking/unlocking a gas cabinet; and
   c) said at least one bar code reader includes means for generating a gas panel lock/unlock control function request for said at least one gas cabinet controller.

12. An interactive computer-controlled facility management system as in claim 8 wherein said alarm data includes a plurality of different alarm events and said multi-ported processor means further comprises means for ranking said alarm event prior to storing in said first memory means.

\* \* \* \* \*